US011380346B2

(12) United States Patent
Cho et al.

(10) Patent No.: US 11,380,346 B2
(45) Date of Patent: Jul. 5, 2022

(54) SIGNAL PROCESSING SYSTEM AND A METHOD OF DETERMINING NOISE REDUCTION AND COMPENSATION THEREOF

(71) Applicant: Wistron Corporation, New Taipei (TW)

(72) Inventors: Ching-An Cho, New Taipei (TW); Yu-Yen Chen, New Taipei (TW); Kuo-Ting Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 154 days.

(21) Appl. No.: 16/881,735

(22) Filed: May 22, 2020

(65) Prior Publication Data

US 2021/0280204 A1 Sep. 9, 2021

(30) Foreign Application Priority Data

Mar. 5, 2020 (TW) ................. 109107165

(51) Int. Cl.
*G10L 21/0232* (2013.01)
*G06F 17/18* (2006.01)
*G10L 13/02* (2013.01)

(52) U.S. Cl.
CPC .......... *G10L 21/0232* (2013.01); *G06F 17/18* (2013.01); *G10L 13/02* (2013.01)

(58) Field of Classification Search
CPC ..... G10L 21/0232; G10L 13/02; G10L 15/00; G10L 21/10; G10L 21/02; G10L 21/0208; G10L 21/0216; G10L 21/0264; G10L 19/005; G10L 19/26; G10L 2021/02082; G10L 19/028; G06F 17/18; H04R 2410/01; H04B 17/345; H04B 10/40; H04B 1/1027; H04B 15/00; H04B 1/38; H04B 3/20; H04B 2210/25; H04W 72/082
See application file for complete search history.

(56) References Cited

U.S. PATENT DOCUMENTS

| 8,473,283 B2 * | 6/2013 | Master ................. G10H 1/0008 704/214 |
| 10,269,375 B2 * | 4/2019 | Arsikere ................. G10L 25/21 |
| 10,595,747 B2 * | 3/2020 | Al-Ali ..................... A61B 7/003 |

(Continued)

FOREIGN PATENT DOCUMENTS

| CN | 104715771 A | 6/2015 |
| CN | 106340303 A | 1/2017 |

(Continued)

OTHER PUBLICATIONS

Office Action dated Jan. 11, 2021 in corresponding Taiwan Patent Application No. 109107165.

*Primary Examiner* — Linda Wong
(74) *Attorney, Agent, or Firm* — Donald E. Stout; Stout, Uxa & Buyan, LLP

(57) ABSTRACT

A method of determining noise reduction in a signal includes transforming the signal to generate a spectrogram; determining sharp change in a frequency spectrum for each frame in the spectrogram; and comparing a counted number of frames having sharp change with a predetermined value. The signal is determined to be subject to noise reduction if the counted number is greater than the predetermined value.

13 Claims, 8 Drawing Sheets

(56) References Cited

U.S. PATENT DOCUMENTS

| | | | |
|---|---|---|---|
| 10,770,051 B2* | 9/2020 | Niedermeier | G06F 17/16 |
| 10,802,572 B2* | 10/2020 | Dayal | G06F 1/3296 |
| 10,860,647 B2* | 12/2020 | Scott | G06F 16/7834 |
| 10,948,417 B2* | 3/2021 | Gou | G01J 3/0208 |
| 2010/0207689 A1* | 8/2010 | Shimada | G10L 21/0208 |
| | | | 327/551 |
| 2019/0090757 A1* | 3/2019 | Xiao | A61B 5/7264 |
| 2020/0020349 A1* | 1/2020 | Disch | G10L 19/26 |
| 2020/0411018 A1* | 12/2020 | Chakravarty | G10L 21/007 |

FOREIGN PATENT DOCUMENTS

| | | | | |
|---|---|---|---|---|
| CN | 109720288 A | 5/2019 | | |
| JP | 6636937 B2 * | 1/2020 | | G10L 21/0208 |

\* cited by examiner

SIGNAL PROCESSING SYSTEM AND A METHOD OF DETERMINING NOISE REDUCTION AND COMPENSATION THEREOF

CROSS-REFERENCE TO RELATED APPLICATIONS

This application claims priority to Taiwan Patent Application No. 109107165, filed on Mar. 5, 2020, the entire contents of which are herein expressly incorporated by reference.

BACKGROUND OF THE INVENTION

1. Field of the Invention

The present invention generally relates to signal processing, and more particularly to a method of determining noise reduction in a signal and a signal compensation method.

2. Description of Related Art

An internet Protocol camera (or IP cam) is a type of digital video camera that transfers image data via the Internet adaptable to surveillance and other applications. The IP cam may send voice data in addition to image data.

The voice data of the IP cam may provide additional service such as monitoring baby cry. In one application, a deep neural network (e.g., convolutional neural network (CNN)) may be adopted to train a voice model, according to which voice recognition may be performed. A training dataset ordinarily contains data without noise reduction. However, some microphones may perform noise reduction while capturing voice. Therefore, a voice recognition rate may probably be reduced when using the IP cam with this microphone.

A need has thus arisen to propose a novel scheme to overcome drawbacks of the conventional IP cams and to increase the voice recognition rate.

SUMMARY OF THE INVENTION

In view of the foregoing, it is an object of the embodiment of the present invention to provide a method of determining noise reduction in a signal and a signal compensation method capable of determining whether a signal has been subject to noise reduction and compensating the signal accordingly.

According to one embodiment of a method of determining noise reduction in a signal, the signal is transformed to generate a spectrogram. It determines sharp change in a frequency spectrum for each frame in the spectrogram. A counted number of frames having sharp change is compared with a predetermined value. The signal is determined to be subject to noise reduction if the counted number is greater than the predetermined value.

DETAILED DESCRIPTION OF THE INVENTION

Figure 1:
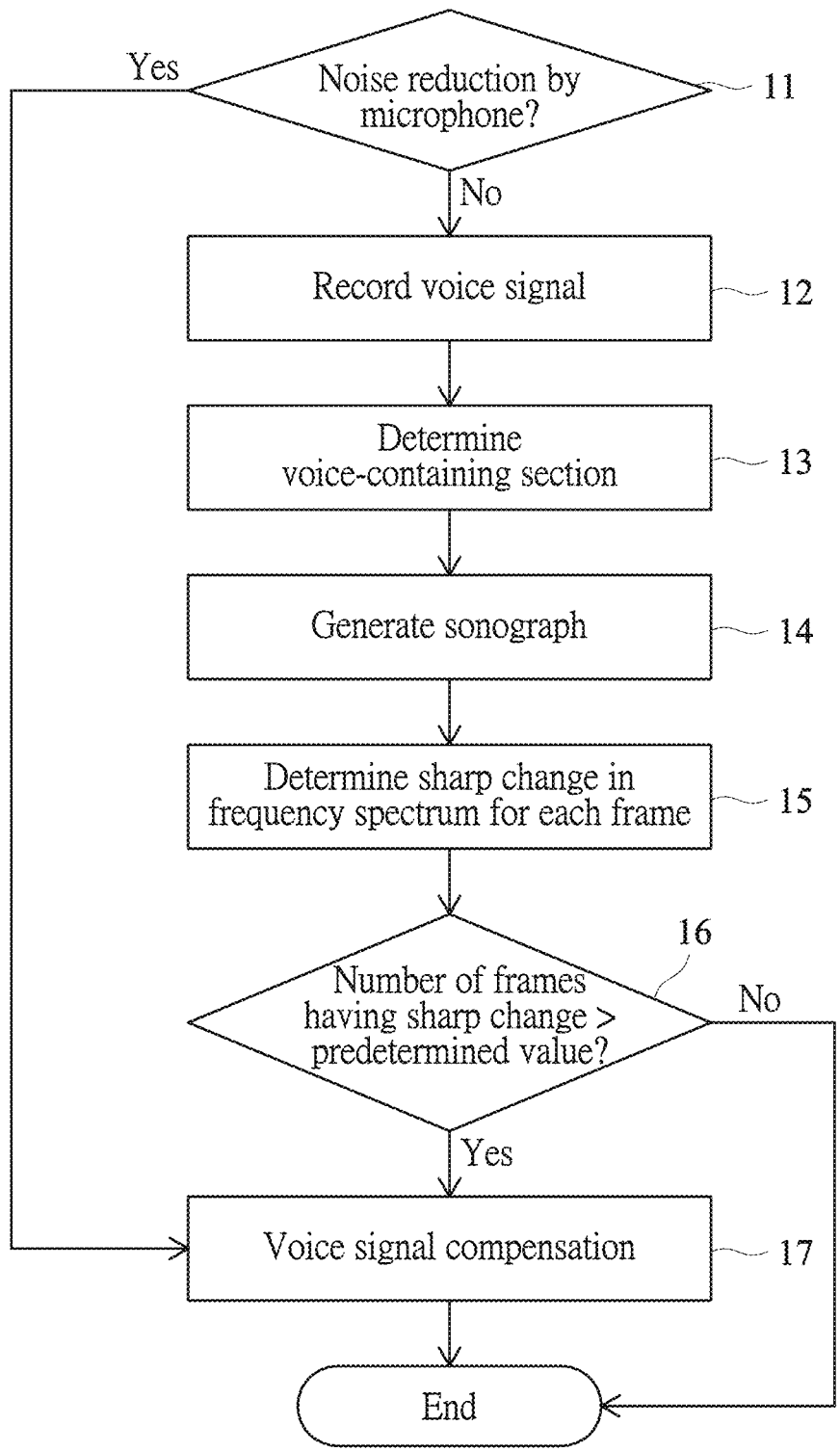
FIG. 1 shows a flow diagram illustrating a voice compensation method according to one embodiment of the present invention.
Figure 2:
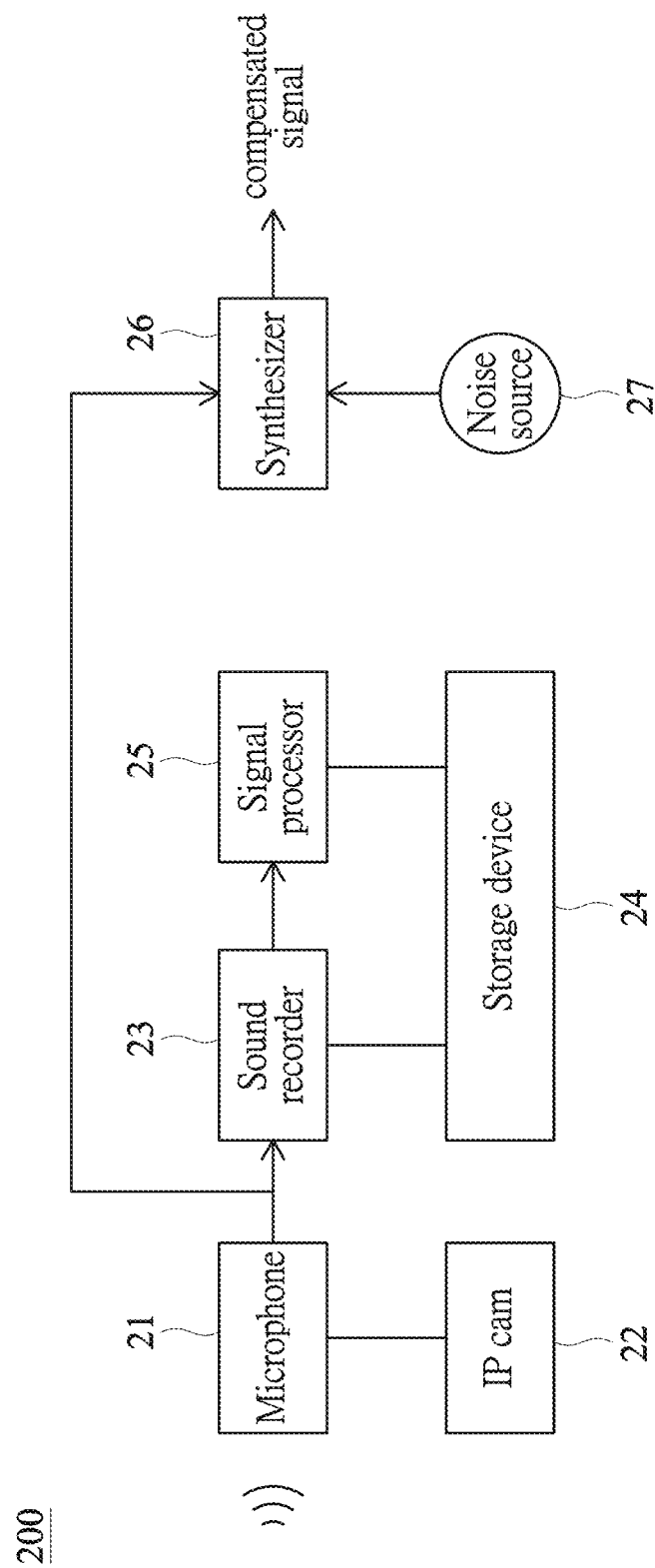
FIG. 2 shows a block diagram illustrating a voice compensation system according to one embodiment of the present invention.

FIG. 1 shows a flow diagram illustrating a voice compensation method 100 according to one embodiment of the present invention, adaptable to voice recognition, for example, using a deep neural network. FIG. 2 shows a block diagram illustrating a voice compensation system 200 according to one embodiment of the present invention. Although voice compensation is exemplified in the embodiment, it is appreciated that the present invention can generally be adaptable to other types of (electrical) signal such as image signal or radar signal.

In step 11, a transducer may transform physical quantity to an electrical signal. In the embodiment, a microphone 21 may transform sound wave to a voice signal. In one embodiment, the microphone 21 may be disposed in an IP cam 22 for monitoring baby cry. If (passive or active) noise reduction is performed while capturing voice by the microphone 21, the flow goes to step 17 to perform signal compensation, otherwise steps 12-16 are executed to determine noise reduction in the signal.

Figure 3A:
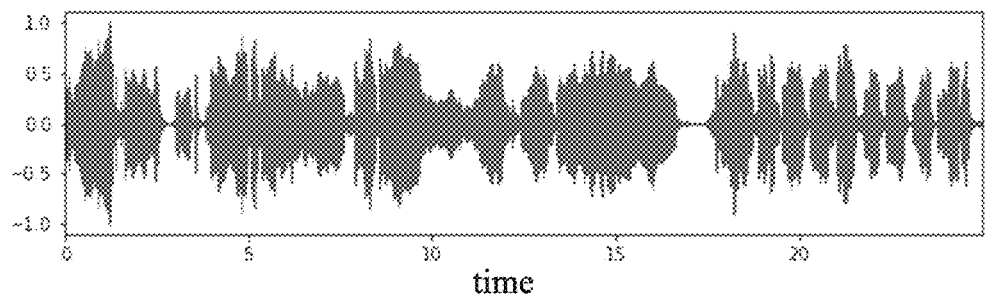
FIG. 3A shows an exemplary intensity waveform of the voice signal.

In step 12, a recorder may perform sampling and analog-to-digital conversion on the signal to facilitate later processing by a signal processor 25 and storage in a storage device 24. In the embodiment, a sound recorder 23 may record the voice signal transformed by the microphone 21, that is, perform sampling and analog-to-digital conversion on the voice signal. FIG. 3A shows an exemplary intensity (or amplitude) waveform of the voice signal, where the vertical axis represents signal intensity and the horizontal axis represents time.

In step 13, the signal processor 25 may receive and process the voice signal to determine voice-containing sections and to discard voice-lacking sections. In the specification, voice signal intensity in a voice-containing section is greater than a predetermined intensity. In the embodiment, the determined voice-containing sections may facilitate determining whether noise reduction is performed while capturing voice by the microphone 21.

Figure 3B:
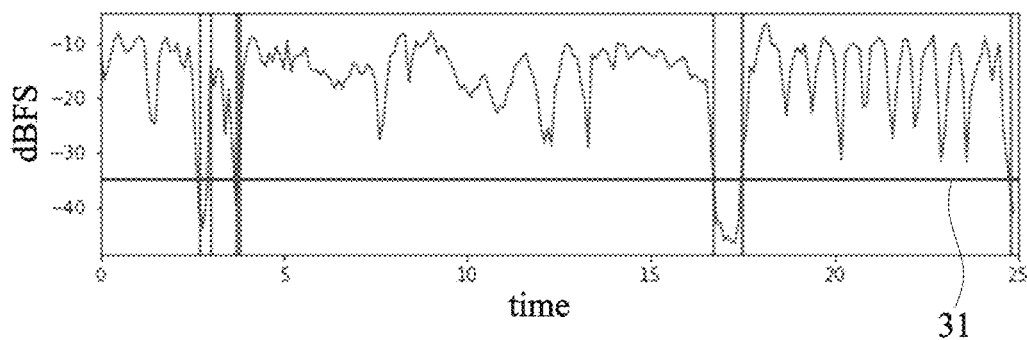
FIG. 3B shows an example that averages signal intensities in every period with predetermined length in the waveform of the voice signal.
Figure 3C:
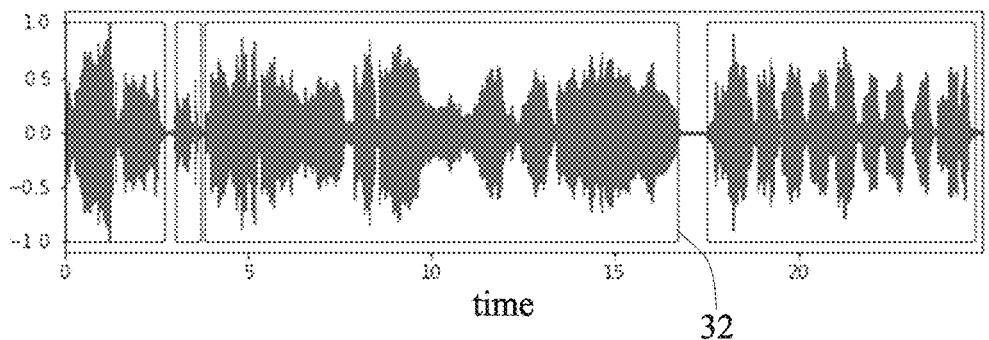
FIG. 3C shows a voice-containing section after compared with the predetermined intensity.

Specifically, in one embodiment, in the waveform of the voice signal, signal intensities in every period with predetermined length (e.g., 100 milliseconds) are averaged and compared with a predetermined intensity. A voice-containing section is determined when the average intensity is greater than the predetermined intensity. FIG. 3B shows an example that averages signal intensities in every period with predetermined length in the waveform of the voice signal. In the embodiment, decibel relative to full scale (dBFS) is used as a unit for signal intensity, according to which 0 represents maximum intensity. As exemplified in FIG. 3B, the predetermined intensity 31 is −35 dBFS corresponding to common conversation volume. FIG. 3C shows a voice-containing section 32 after compared with the predetermined intensity.

Figure 3D:
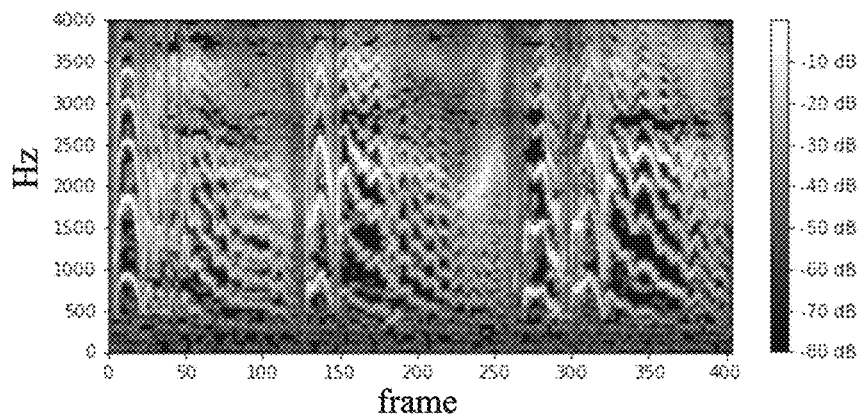
FIG. 3D shows an exemplary sonograph of the voice signal.

In step 14, the signal processor 25 may transform the voice signal (of the voice-containing section) to generate a spectrogram. In the embodiment, a sonograph is generated to represent a relationship between frequency spectrum and time of the voice signal. FIG. 3D shows an exemplary sonograph of the voice signal, where the vertical axis represents frequency, the horizontal axis represents time, and brightness of each pixel corresponds to energy intensity (e.g., brighter pixel corresponds to higher energy intensity). In the embodiment, a time unit of the sonograph is frame, which may be obtained according to the sampling rate of the signal. As human auditory perception of hertz (Hz) is nonlinear, a mel frequency $f_{mel}$ is used as a frequency unit in the embodiment such that human auditory perception becomes linear. The relationship between mel frequency $f_{mel}$ and hertz $f_{Hz}$ may be expressed as follows: $f_{mel}=2595 \times \log_{10}(1+f_{Hz}/700)$.

In step 15, the signal processor 25 may determine sharp change in a frequency spectrum for each frame in order to determine whether noise reduction is performed while capturing voice by the microphone 21. In the embodiment, sharp change in the frequency spectrum of a frame is determined if there is at least one signal having signal slope greater than a predetermined slope. In another embodiment, sharp change in the frequency spectrum of a frame is determined if there are at least two signals having signal slope greater than a predetermined slope. Generally speaking, sharp change in the frequency spectrum for a frame is determined if a number of signals having signal slope greater than a predetermined slope is equal to or greater than a predetermined threshold.

Figure 4:
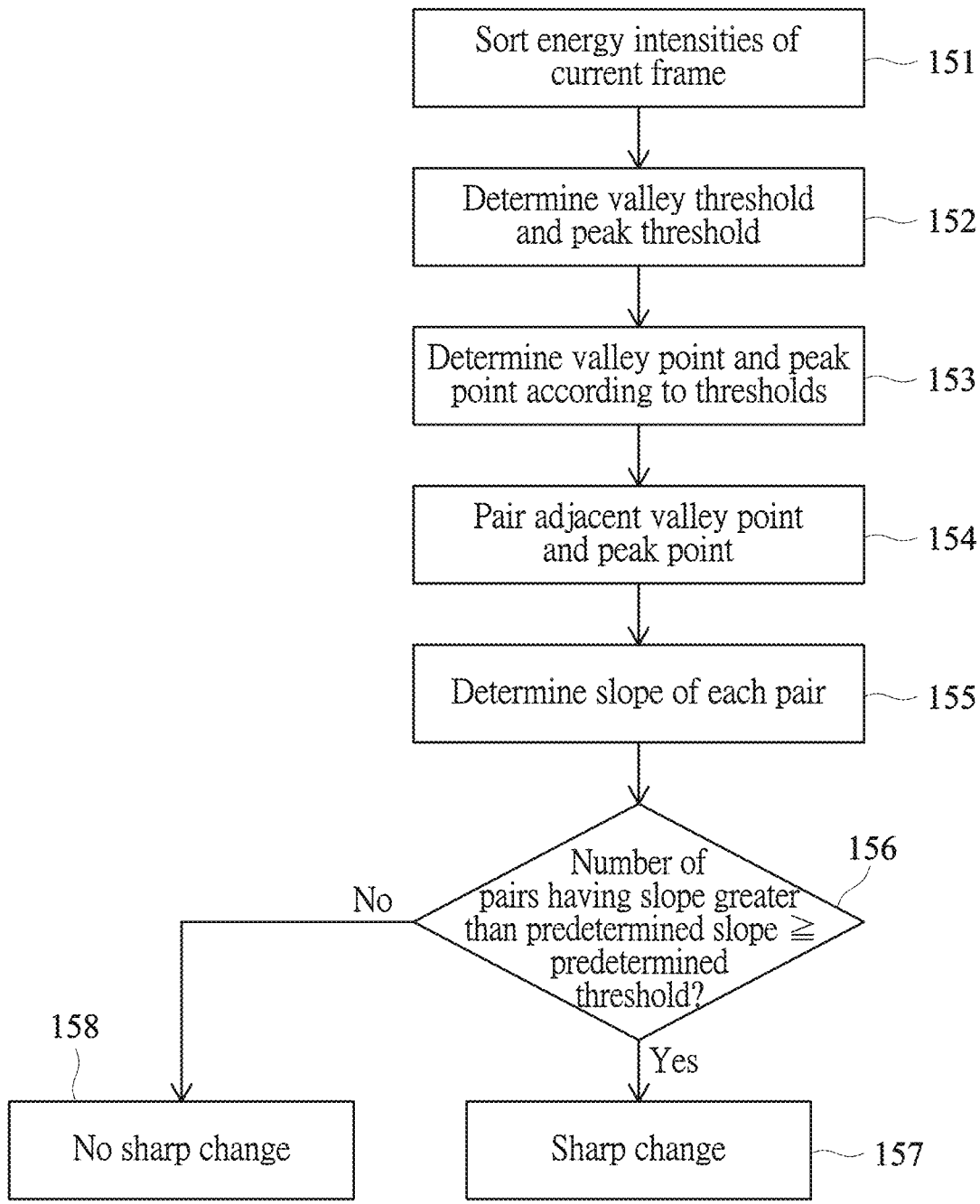
FIG. 4 shows a detailed flow diagram of step 15 in FIG. 1.
Figure 5A:
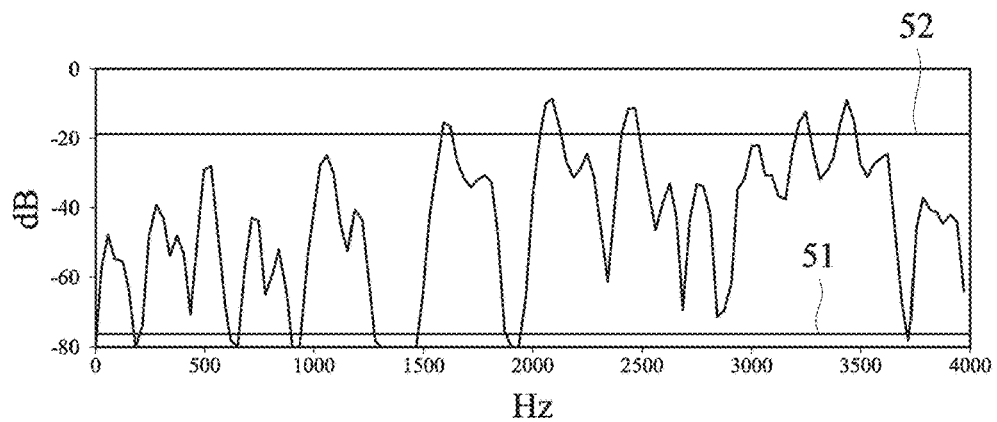
FIG. 5A shows an exemplary frequency spectrum of a current frame.

FIG. 4 shows a detailed flow diagram of step 15 in FIG. 1. In step 151, energy intensities in a frequency spectrum of a current frame may be sorted. FIG. 5A shows an exemplary frequency spectrum of a current frame, where the vertical axis represents energy intensity and the horizontal axis represents frequency. For example, energy intensities are sorted from low to high to obtain [−80,−80,−78.5, . . . , −21,−20,−16].

Next, in step 152, a valley threshold 51 (FIG. 5A) may be determined by averaging plural smallest energy intensities (e.g., foremost 10% of the sorted energy intensities); and a peak threshold 52 (FIG. 5A) may be determined by averaging plural largest energy intensities (e.g., last 20% of the sorted energy intensities).

Figure 5B:
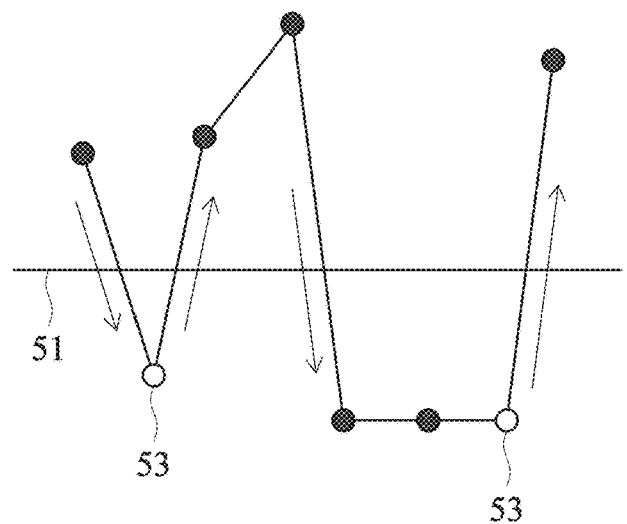
FIG. 5B to FIG. 5C show exemplary partial enlarged frequency spectra.
Figure 5C:
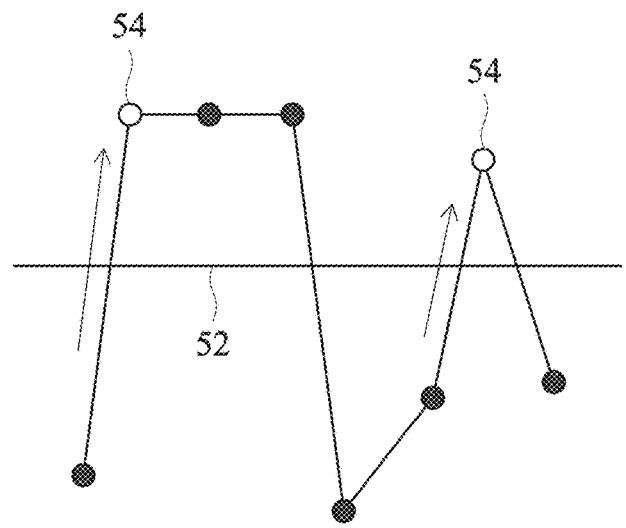

In step 153, a valley point in the frequency spectrum (as exemplified in FIG. 5A) may be determined according to the valley threshold 51. FIG. 5B shows an exemplary partial enlarged frequency spectrum, in which the last value of turning point(s) less than the valley threshold 51 is determined to be a valley point 53. A peak point in the frequency spectrum may be determined according to the peak threshold 52. FIG. 5C shows an exemplary partial enlarged frequency spectrum, in which the first value of turning point(s) larger than the peak threshold 52 is determined to be a peak point 54.

Figure 5D:
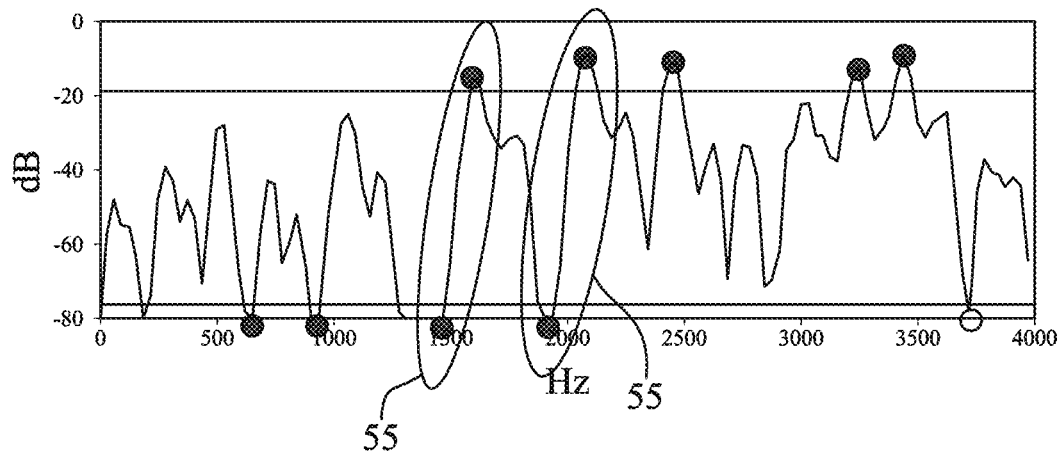
FIG. 5D exemplifies pairs of adjacent valley points and peak points.

In step 154, adjacent valley points 53 and peak points 54 may be paired. FIG. 5D exemplifies pairs 55 of adjacent valley points 53 and peak points 54, in which the valley point 53 is to the left of the peak point 54.

Figure 5E:
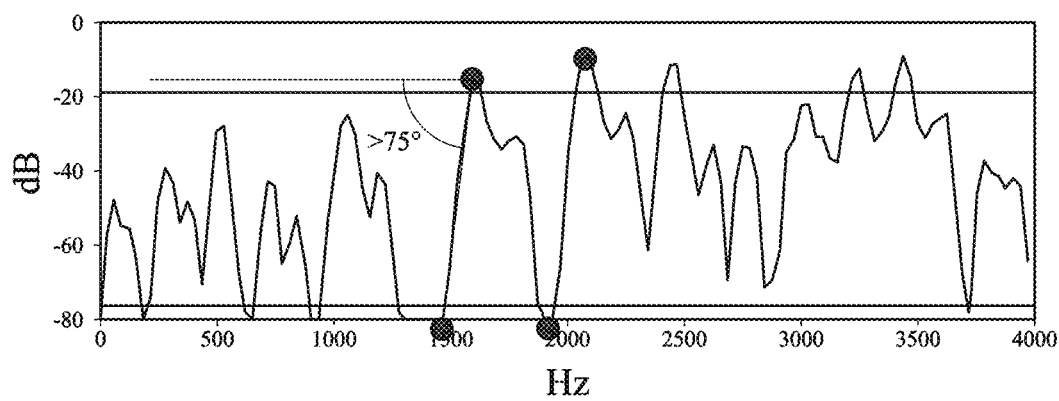
FIG. 5E exemplifies a pair having a slope greater than the predetermined slope.

In step 155, a slope of a connecting line between the valley point 53 and the peak point 54 of each pair 55 may be determined. Next, in step 156, it determines whether a number of pairs 55 having a slope greater than the predetermined slope of the current frame is equal to or greater than the predetermined threshold. If the determination in step 156 is positive, sharp change of the current frame is determined (step 157), otherwise sharp change of the current frame is not determined (step 158). FIG. 5E exemplifies a pair 55 having a slope greater than the predetermined slope (equivalent to 75 degrees). Steps 151-157 may be repeatedly executed for each frame (or for partial frames).

Referring back to FIG. 1, in step 16, a counted number of frames having sharp change is compared with a predetermined value. If the counted number is greater than the predetermined value (e.g., more than half of the frames), it is determined that noise reduction is performed while capturing voice by the microphone 21, and the flow goes to step 17 to perform compensation on the voice signal.

In step 17, a synthesizer 26 may add the voice signal transformed by the microphone 21 and a noise signal provided by a noise source 27, thereby obtaining a compensated signal. In the embodiment, the noise source 27 may provide an additive white Gaussian noise (AWGN) signal having energy intensity being uniformly distributed in the entire frequency domain. In the embodiment, the noise signal may be added according to a signal-to-noise ratio (SNR). High SNR indicates less added noise energy, or, alternatively, low SNR indicates more added noise energy.

Figure 6:
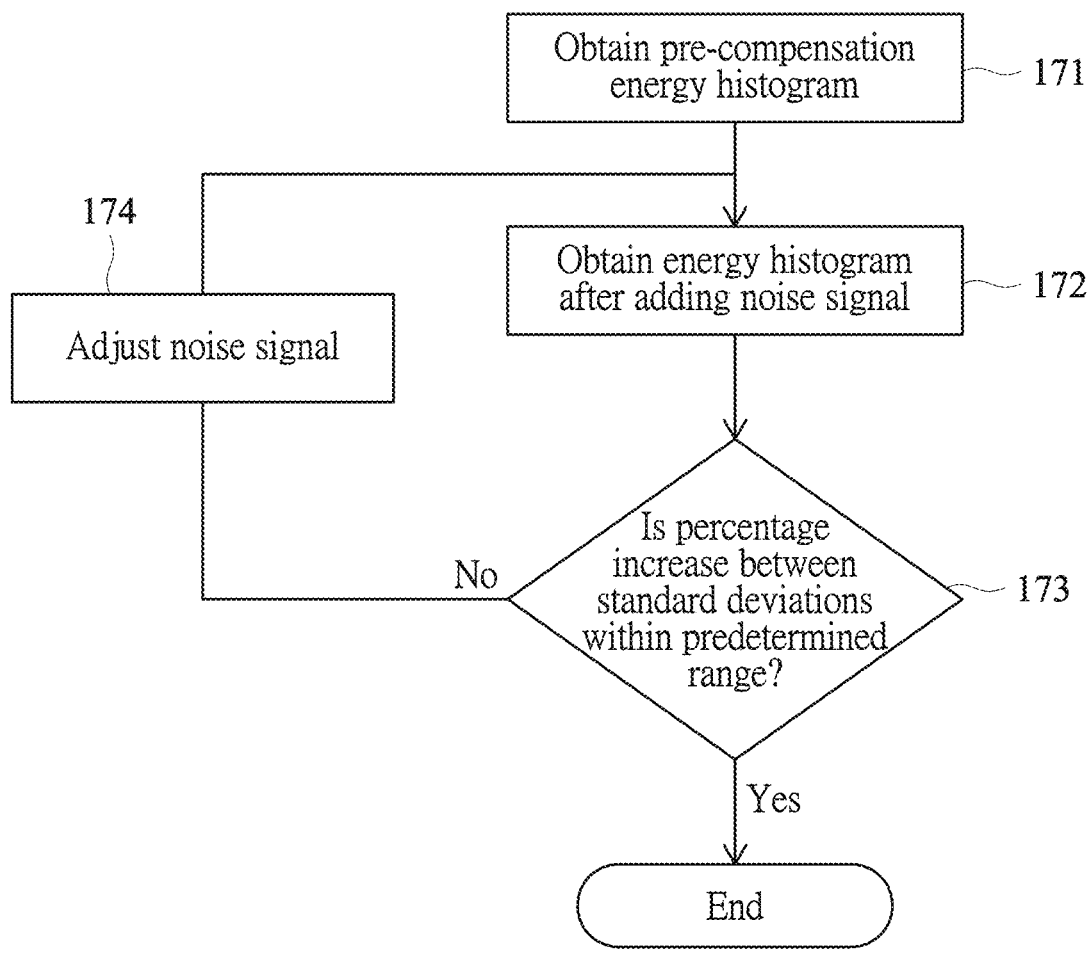
FIG. 6 shows a detailed flow diagram of step 17 in FIG. 1.
Figure 7A:
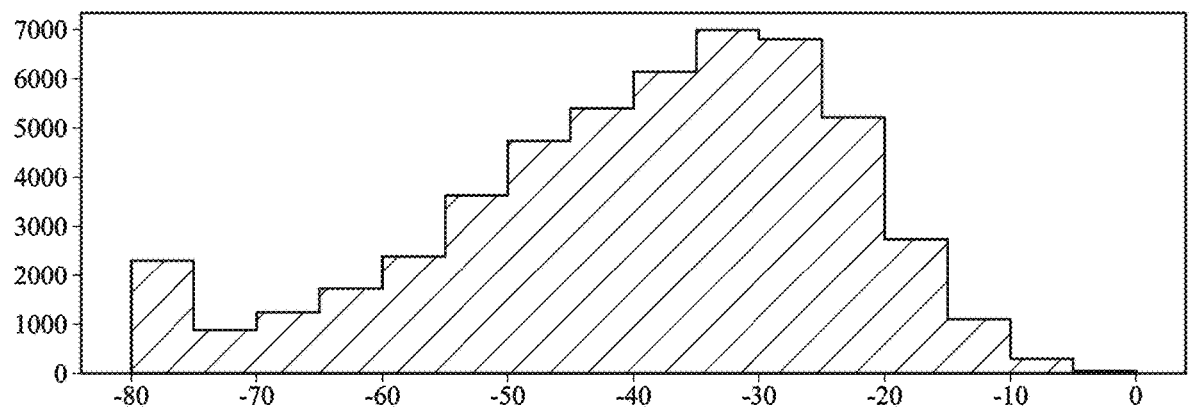
FIG. 7A shows an exemplary pre-compensation energy histogram.

FIG. 6 shows a detailed flow diagram of step 17 in FIG. 1. First, in step 171, a pre-compensation energy histogram may be obtained according to a pre-compensation sonograph (as exemplified in FIG. 3D). FIG. 7A shows an exemplary pre-compensation energy histogram, where the horizontal axis represents energy intensity and the vertical axis represents a number of pixels. In one embodiment, pixels are counted in each interval with predetermined length (e.g., 5 dB) in the sonograph. In step 172, an energy histogram after adding a noise signal may be obtained according to a sonograph after adding the noise signal.

In step 173, a (first) standard deviation of the pre-compensation energy histogram may be compared with a (second) standard deviation of the energy histogram after adding the noise signal. If a percentage increase between the second standard deviation and the first standard deviation is within a predetermined range (e.g., 7-13%), signal compensation may be terminated; otherwise, the noise signal of the noise source 27 may be adjusted (step 174), and the flow goes back to step 172 to obtain corresponding energy histogram and standard deviation again.

Figure 7B:
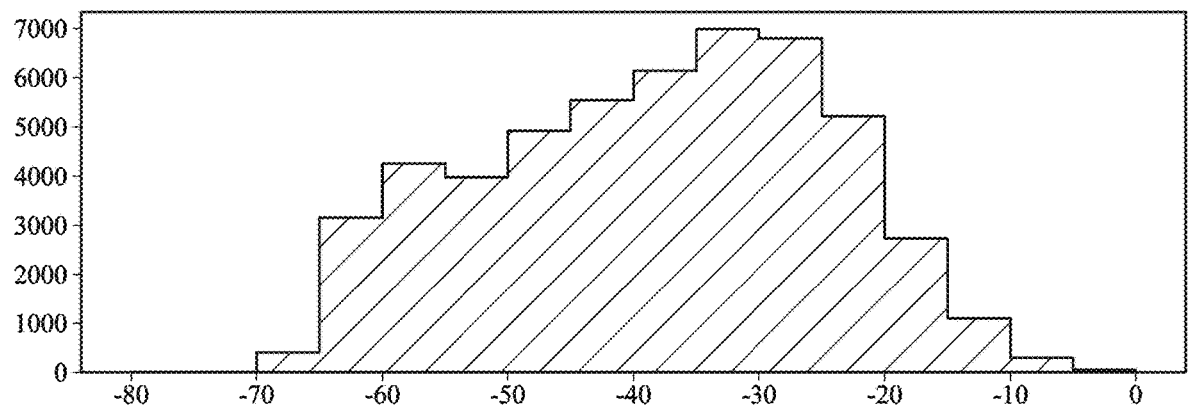
FIG. 7B shows an exemplary after-compensation energy histogram.

FIG. 7B shows an exemplary after-compensation energy histogram having a standard deviation of 2515. Compared to the pre-compensation energy histogram (having a standard deviation of 2277) of FIG. 7A, the percentage increase between the after-compensation standard deviation and the pre-compensation standard deviation is 10.4%, which is within the predetermined range (7-13%).

According to the method and system of the embodiment, noise reduction in a variety of voice signals may be determined, and compensation may be made on the noise-reduced voice signals. Therefore, a single voice recognition method with enhanced voice recognition rate may be adapted to a variety of voice signals.

Although specific embodiments have been illustrated and described, it will be appreciated by those skilled in the art that various modifications may be made without departing from the scope of the present invention, which is intended to be limited solely by the appended claims.

What is claimed is:

1. A method of determining noise reduction in a signal, comprising:
   (a) transforming the signal to generate a spectrogram by a signal processor;
   (b) determining sharp change in a frequency spectrum for each frame in the spectrogram; and
   (c) comparing a counted number of frames having sharp change with a predetermined value;
   wherein the signal is determined as having been subject to noise reduction if the counted number is greater than the predetermined value and
   (d) adding a noise signal to the signal with noise reduction, thereby obtaining a compensated signal.

2. The method of claim 1, wherein the noise signal comprises an additive white Gaussian noise (AWGN) signal.

3. The method of claim 1, wherein the step (b) comprises:
   determining at least one valley point in the frequency spectrum according to a valley threshold, and determining at least one peak point in the frequency spectrum according to a peak threshold;
   pairing adjacent valley point and peak point;
   determining a slope of each pair of the valley point and the peak point;
   wherein sharp change in the frequency spectrum of the frame is determined when a number of pairs having the slope greater than a predetermined slope is equal to or greater than a predetermined threshold.

4. The method of claim 3, wherein the step (b) further comprises:
   averaging a plurality of smallest energy intensities in the frequency spectrum to be the valley threshold, and averaging a plurality of largest energy intensities in the frequency spectrum to be the peak threshold.

5. The method of claim 1, further comprising:
   transform physical quantity to the signal.

6. The method of claim 5, further comprising:
   processing the signal to determine a section containing the physical quantity, and to discard a section not containing the physical quantity.

7. The method of claim 1, wherein the signal is a voice signal.

8. The method of claim 7, wherein a mel frequency is used as a frequency unit in the spectrogram.

9. A signal processing system, comprising:
   a transducer that transforms physical quantity to a signal;
   a signal processor performing the following steps:
   (a) transforming the signal to generate a spectrogram;
   (b) determining sharp change in a frequency spectrum for each frame in the spectrogram; and
   (c) comparing a counted number of frames having sharp change with a predetermined value, the signal being determined as having been subject to noise reduction if the counted number is greater than the predetermined value;
   a noise source that provides a noise signal; and
   a synthesizer that adds the noise signal and the signal with noise reduction, thereby obtaining a compensated signal.

10. The system of claim 9, wherein the noise signal comprises an additive white Gaussian noise (AWGN) signal.

11. The system of claim 9, further comprising:
    a recorder that records the signal by performing sampling and analog-to-digital conversion on the signal; and
    a storage device that stores the signal recorded by the recorder.

12. The system of claim 9, wherein the signal is a voice signal.

13. The system of claim 12, wherein a mel frequency is used as a frequency unit in the spectrogram.

* * * * *